United States Patent Office 3,382,209
Patented May 7, 1968

3,382,209
FLAME-RETARDANT SYSTEMS
William George Deichert, Flushing, N.Y., assignor to American Cyanamid Company, Stamford, Conn., a corporation of Maine
No Drawing. Filed May 23, 1966, Ser. No. 551,907
9 Claims. (Cl. 260—45.75)

ABSTRACT OF THE DISCLOSURE

Polyacrylate resins are made resistant to burning and water-induced haziness by incorporating a stannic halide, oxalic acid and a member from the group consisting of the zinc and magnesium salts of carbonic or oxalic acid.

---

This invention relates to water-resistant, flame-retarded compositions. More particularly, this invention relates to water-resistant, flame-retarded compositions comprising an acrylate or methacrylate polymer containing (1) a flame-retarding amount of a stannic halide, (2) oxalic acid and (3) zinc carbonate, magnesium carbonate, zinc oxalate or magnesium oxalate. Still more particularly, this invention relates to novel, water-resistant, flame-retarded compositions comprising an acrylate or methacrylate polymer containing (1) a flame-retarding amount of a stannic halide having the formula (I) $$SnX_4$$

wherein X is chlorine, bromine or iodine, (2) oxalic acid and (3) zinc carbonate, magnesium carbonate, zinc oxalate, or magnesium oxalate.

The production of acrylate and methacrylate compositions which are flame-retardant, i.e. have high resistance to burning, is of considerable commercial importance. For example, such articles as castings, moldings or laminated structures and the like are required, or at least desired, to be resistant to fire and flame and to possess the ability to endure heat without deterioration. Typical illustrations of such applications include structural members such as wall coverings, wall paneling, windows and items such as skylights, shower stalls, room dividers and the like.

In application Ser. No. 551,946, of even date herewith, the use of a combination of oxalic acid and various stannic halides to impart flame-retardance and water-resistance to acrylate polymers is disclosed and claimed. The combination impart flame-retardance and water-resistance to the polymers at concentrations of at least 5%, by weight, of the halide and at least 0.1%, by weight, of the oxalic acid.

The instant application discloses an improvement over said stannic halide-oxalic acid flame-retarded compositions. That is to say, I have now found that the incorporation of zinc carbonate, magnesium carbonate, zinc oxalate or magnesium oxalate into the oxalic acid-stannic halide-acrylate resin compositions, results in compositions which are even more resistant to the damaging effects of water. More particularly, I have found that the incorporation of zinc carbonate, magnesium carbonate, zinc oxalate or magnesium oxalate into the oxalic acid-stannic halide-acrylate resin system prevents haziness from forming in the resultant composition upon contact thereof with water, i.e. water per se or water in the form of a gas, e.g. humidity in the atmosphere. Furthermore, in some instances, the addition of the carbonate or oxalate not only imparts water-resistance to the ultimate acrylate product but also enables the use of lesser amounts of stannic halide with substantially equivalent flame-proofing results.

It is therefore an object of the present invention to provide novel, water-resistant, flame-retarded acrylate or methacrylate polymers.

It is a further object of the present invention to provide water-resistant, flame-retarded compositions comprising an acrylate or methacrylate polymer, (1) a flame-retarding amount of a stannic halide represented by Formula I, above, (2) oxalic acid and (3) zinc carbonate, magnesium carbonate, zinc oxalate or magnesium oxalate.

These and further objects will become more apparent to those skilled in the art upon reading the more detailed description set forth hereinbelow.

The oxalic acid-stannic halide-containing acrylate and methacrylate polymers into which the carbonate or oxalate may be incorporated to produce the novel water-resistant compositions of the present invention, are the acrylate and methacrylate polymers produced from monomers having the formula (II) 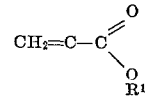

wherein R is hydrogen or a methyl radical and $R^1$ is hydrogen or an alkyl radical having from 1 to 6 carbon atoms, inclusive. Examples of monomers represented by Formula II include acrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and the corresponding methyl, ethyl, n-propyl, isopropyl, n-butyl, t-butyl, isobutyl, n-amyl, t-amyl and hexyl methacrylates.

The acrylate and methacrylate polymers may be utilized as homopolymers or copolymers thereof in amounts such that the final polymers contain at least 30%, by weight, based on the total weight of the polymer, of the acrylate, methacrylate or mixture thereof.

Examples of monomers which can be copolymerized with the monomers represented in Formula II, either singly or in a plurality (two, three, four or any desired number), the latter often being desirable in order to improve the compatibility and copolymerization characteristics of the mixture of monomers and to obtain copolymers having the particular properties desired for the particular service application, in amounts up to about 70%, by weight, based on the total weight of the polymer, are such monomers as the unsaturated alcohol esters, more particularly the allyl, methallyl, vinyl, etc., esters of saturated and unsaturated aliphatic and aromatic monobasic and polybasic acids, such as, for instance, acetic, propionic, butyric, malonic, succinic, maleic, fumaric, citraconic, itaconic, benzoic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes; the various poly-substituted styrenes such, for example, as the various di-, tri-, and tetra-chlorostyrenes, -bromostyrenes, -fluorostyrenes, -methylstyrenes, -ethylstyrenes, -syanostyrenes, etc., vinyl naphthalene, vinylcyclohexane, vinyl flurane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.

Other examples of monomers that can be copolymerized with the monomers of Formula II are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride, vinylidene iodide and the like.

More specific examples of allyl compounds that can be copolymerized with the allyl compounds of Formula II are allyl alcohol, methallyl alcohol, diallyl carbonate, allyl lactate, allyl α-hydroxyisobutyrate, allyl trichlorosilane, diallyl diglycol carbonate, diallyl methylgluconate, diallyl phthalate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballyate, triallyl cyanurate, triallyl isocyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

Among the comonomers which are preferred for use in carrying our invention into effect are, for example, compounds such as acrylonitrile, the various substituted acrylonitriles (e.g., methacrylonitrile, ethacrylonitrile, phenylacrylonitrile, etc.); acrylamide and the various N-substituted acrylamides and alkacrylamides, for instance, N-dialkyl acrylamides and methacrylamides, e.g., N-dimethyl, -diethyl, -dipropyl, -dibutyl, etc., acrylamides and methacrylamides. Also the glycol diacrylates, i.e. those compounds produced by esterifying acrylic or methacrylic acid with a polyglycol having 4–8 carbon atoms or a monoglycol having 2–4 carbon atoms. Examples of these glycols include diethylene glycol, triethylene glycol, tetraethylene glycol, dipropylene glycol, bis(4-hydroxybutyl) ether, polyethylene glycol, ethylene glycol, propylene glycol, the propanediols 1,2 and 1,3; the butanediols 1,2:1,3 and 1,4 and the like.

Of course, it is also possible to utilize copolymers produced from two or more of the monomers represented by Formula II, above and still obtain the benefits heretofore set forth.

The above mentioned monomers may be polymerized, copolymerized, etc., in any known manner such as by free-radical generating catalysts, irradiation, anion and/or cation-type catalysts and the like, the specific method of polymerization, however, forming no part of the present invention.

The stannic halides are present in the acrylate polymer in the form of stannic chloride, stannic bromide or stannic iodide per se and may also be added to the polymer as admixtures with one another. The oxalic acid, may, of course, be used in combination with a single halide or mixtures of halides in the acrylate polymer. The instant invention should, therefore, be construed as including both the use of single stannic halides or mixtures of two or more of the halides in addition to the oxalic acid and the oxalate or carbonate. The stannic halides are present, singly or in admixture, in the polymers in flame-retarding amounts, i.e. at least about 3%, by weight, and preferably from about 7% to about 15%, by weight, based on the total weight of the polymer, oxalic acid, and oxalate or carbonate.

The oxalic acid may be present in amounts of at least 0.1%, by weight, preferably 0.5% to 5.0%, by weight, based on the total weight of the polymer, stannic halide, oxalic acid and oxalate or carbonate.

The magnesium carbonate, zinc carbonate, magnesium oxalate or magnesium carbonate is added to the oxalic acid - stannic halide - acrylate polymer composition in amounts ranging from about 0.1% to about 3%, by weight, preferably about 0.1 to about 1.0%, by weight, based on the total weight of the polymer, halide, oxalic acid and carbonate or oxalate.

The method of incorporating the carbonate or oxalate into the polymer is not critical and any known method may be used. One method is to add the carbonate or oxalate during the polymer or product production, i.e. during the polymerization or casting etc. The material may also be added to a solvent solution of the polymer, which solvent is then removed by evaporation, etc. Additionally, the material may be added to the polymer by (1) molding or extruding them simultaneously, (2) milling them on, for example, a two-roll mill, a Banbury mixer, etc., or (3) by merely blending the material with the polymer in powder form.

The carbonate or oxalate, the stannic halide flame-proofing material and the oxalic acid may be added together, singly and in any order to the acrylate polymer utilizing, for example, any of the above-described incorporation techniques, without departing from the scope of the instant invention.

It should be noted that it is also within the scope of the present invention to incorporate such ingredients as plasticizers, dyes, pigments, stabilizers, anti-oxidants, antistatic agents, photochromic materials and the like to our novel compositions.

The compositions of the instant invention find use in any application generally afforded to acrylate polymers such as films, adhesives, molding compounds, glazing, etc. Additionally, they may be subjected to high temperature (i.e. 150–200° C.) to cause a foaming action, thereby resulting in structures whose properties suggest their usage as insulating materials.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retarding properties of any specific compound or combination of compounds. One test which is reasonably efficient is ASTM test D-635-63. The specifications for this test are: a specimen, 5" in length, 0.5" in width and 0.125" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

An alternate test is to form a film of about 0.125" in thickness and place a burning match in contact therewith. If the film continues to burn after the match is removed, the film is not flame-proof.

Example 1

To 86 parts of methyl methacrylate are added 10 parts of SnCl$_4$, 3 parts of oxalic acid, 1.0 part of zinc carbonate and 0.3 part of benzoyl peroxide. Upon polymerizing the resultant mixture between clamped glass plates at 55° C. for 16 hours, 70° C. for 1 hour and 105° C. for 1 hour, a cast sheet is recovered. Upon subjecting said sheet to the ASTM-D-635-63 flame-test specified above, percent burning is 18. The Barcol hardness of the sheet is 50. The sheet is transparent and remains as such when immersed in water for 72 hours. When no SnCl$_4$ is present, the burning rate of poly(methyl methacrylate) is 100% according to the same test.

Following the procedure of Example 1, various other acrylate and methacrylate polymers were formed containing various additives according to the present invention. The results are set forth in Table I, below.

TABLE I

| Ex. | Polymer | Halide | Percent | Oxalic Acid, Percent | Carbonate or Oxalate | Percent | Percent Burn ASTM-D-635-63 | Match Test | Water Contract Results |
|---|---|---|---|---|---|---|---|---|---|
| 2 | Poly(methyl methacrylate) | SnCl₄ | 10.0 | 3.0 | ZnCO₃ | 0.50 | 20 | | No effect after 72 hours. |
| 3 (comp) | ....do.... | SnCl₄ | 14.0 | | | | 19 | | Hazy after 24 hours. |
| 4 | ....do.... | SnCl₄ | 7.0 | 3.0 | ZnCO₃ | 0.50 | 22 | | No effect after 72 hours. |
| 5 | ....do.... | SnCl₄ | 7.0 | 3.0 | Zn(C₂O₄) | 2.0 | | Self-extinguishing. | Do. |
| 6 | ....do.... | SnCl₄ | 10.0 | 4.0 | MgCO₃ | 1.50 | | ....do...... | Do. |
| 7 | ....do.... | SnCl₄ | 9.0 | 5.0 | Mg(C₂O₄) | 2.0 | | ....do...... | Do. |
| 8 | Terpolymer of methyl methacrylate/acrylonitrile/acrylamide, 32.8/64.4/2.8. | SnCl₄ | 10.0 | 5.0 | ZnCO₃ | 1.0 | | ....do...... | Do. |
| 9 (comp) | ....do.... | SnCl₄ | 15.0 | | | | | ....do...... | Hazy after 24 hours. |
| 10 | Methyl methacrylate/ethyl acrylate copolymer, 90/10. | SnBr₄ | 9.0 | 3.0 | ZnCO₃ | 0.30 | | ....do...... | No effect after 72 hours. |
| 11 | Methyl methacrylate/styrene copolymer, 99/1. | SnCl₄ | 10.0 | 4.0 | ZnCO₃ | 0.70 | | ....do...... | Do. |
| 12 | Poly(ethyl acrylate) | SnCl₄ | 10.0 | 0.10 | ZnCO₃ | 1.0 | | ....do...... | Do. |
| 13 | Methyl methacrylate/vinyl acetate copolymer, 98/2. | SnBr₄ plus SnCl₄ | 4.0 4.0 | 2.0 | ZnCO₃ | 0.50 | | ....do...... | Do. |
| 14 | Poly(n-hexyl acrylate) | SnCl₄ plus SnI₄ | 5.0 2.0 | 2.0 | Zn(C₂O₄) | 1.0 | | ....do...... | Do. |
| 15 | N-hexyl methacrylate/acrylamide copolymer, 80/20. | SnBr₄ | 7.0 | 3.0 | ZnCO₃ | 2.0 | | ....do...... | Do. |
| 16 | Poly(acrylic acid) | SnI₄ | 4.0 | 2.0 | Mg(C₂O₄) | 2.0 | | ....do...... | Do. |
| 17 (comp) | Poly(methyl methacrylate) | SnCl₄ | 10.0 | 3.0 | | | | ....do...... | Hazy after 54 hours. |
| 18 (comp) | Terpolymer of methyl methacrylate/acrylonitrile/acrylamide, 32.8/64.4/2.8. | SnCl₄ | 10.0 | 5.0 | | | | ....do...... | Do. |
| 19 (comp) | Methyl methacrylate/ethyl acrylate copolymer, 90/10. | SnBr₄ | 9.0 | 3.0 | | | | ....do...... | Do. |
| 20 (comp) | Methyl methacrylate/styrene copolymer, 99/1. | SnCl₄ | 10.0 | 4.0 | | | | ....do...... | Do. |
| 21 (comp) | Methyl methacrylate/vinyl acetate copolymer, 98/2. | SnBr₄ plus SnCl₄ | 4.0 | 2.0 | | | | ....do...... | Do. |
| 22 (comp) | N-hexyl methacrylate/acrylamide copolymer, 80/20. | SnBr₄ | 7.0 | 3.0 | | | | ....do...... | Do. |

Code For Table I:
Comp=Comparative.
*=Water Contact—completely immersed in room temperature water.

I claim:
1. A water-resistant, flame-retarded composition comprising a polymer of an acrylic monomer having the formula

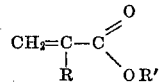

wherein R is selected from the group consisting of hydrogen and a methyl radical and R' is selected from the group consisting of hydrogen and an alkyl radical having from 1–6 carbon atoms, inclusive, having incorporated therein (1) a flame-retarding amount of an additive having the formula

wherein X is selected from the group consisting of chlorine, bromine and iodine, (2) at least 0.1%, by weight, based on the weight of the composition, of oxalic acid and (3) from about 0.1% to about 3.0%, by weight, based on the weight of the composition, of a compound selected from the group consisting of magnesium carbonate, magnesium oxalate, zinc carbonate and zinc oxalate.

2. A composition according to claim 1 wherein said polymer contains up to 70%, by weight, based on the total weight of the polymer, of at least one ethylenically unsaturated monomer copolymerizable with said acrylic monomer.

3. A composition according to claim 1 wherein said polymer is poly(methyl methacrylate).

4. A composition according to claim 1 wherein said polymer is a copolymer of methyl methacrylate and acrylonitrile.

5. A composition according to claim 1 wherein said polymer is a copolymer of methyl methacrylate, acrylonitrile and acrylamide.

6. A composition according to claim 1 wherein (1) is stannic chloride, (2) is oxalic acid and (3) is zinc carbonate.

7. A composition according to claim 1 wherein (1) is stannic chloride (2) is oxalic acid and (3) is magnesium carbonate.

8. A composition according to claim 1 wherein (3) is zinc oxalate.

9. A composition according to claim 1 wherein (1) is stannic iodide.

References Cited
UNITED STATES PATENTS

| | | | |
|---|---|---|---|
| 1,793,420 | 2/1931 | Block et al. | 252—7 |
| 1,895,691 | 1/1933 | Thomas et al. | 252—7 |
| 2,397,320 | 3/1946 | Koch | 106—15 |
| 3,238,129 | 3/1966 | Veltman | 252—7 |
| 3,239,482 | 3/1966 | Rapp | 260—45.75 |

DONALD E. CZAJA, *Primary Examiner.*

V. P. HOKE, *Asistant Examiner.*